(12) United States Patent
Stevens et al.

(10) Patent No.: US 12,531,090 B1
(45) Date of Patent: Jan. 20, 2026

(54) HEAT-ASSISTED MAGNETIC RECORDING HARD DISK DRIVE WITH A THERMALLY PROCESSED TOP COVER

(71) Applicant: Seagate Technology LLC, Fremont, CA (US)

(72) Inventors: Daniel Raymond Stevens, Longmont, CO (US); Paul Sheldon Tyler, Apple Valley, MN (US); Michael Yi Zhao Yao, Singapore (SG); Nipata Nonphonkrang, Nakhon Ratchasima (TH); Jeffrey James Croxall, Longmont, CO (US); Nuttawan Danvivatanaporn, Bangkok (TH); Sonia Marrero, Longmont, CO (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 18/398,454

(22) Filed: Dec. 28, 2023

Related U.S. Application Data

(60) Provisional application No. 63/477,408, filed on Dec. 28, 2022.

(51) Int. Cl.
*G11B 33/14* (2006.01)
*G11B 25/04* (2006.01)
*G11B 33/02* (2006.01)
*G11B 5/00* (2006.01)

(52) U.S. Cl.
CPC ........ *G11B 33/1406* (2013.01); *G11B 25/043* (2013.01); *G11B 33/027* (2013.01); *G11B 33/1446* (2013.01); *G11B 2005/0021* (2013.01)

(58) Field of Classification Search
None
See application file for complete search history.

(56) References Cited

U.S. PATENT DOCUMENTS

| | | | | |
|---|---|---|---|---|
| 7,298,584 B1 * | 11/2007 | Yamada et al. | ...... | G11B 25/043 360/99.22 |
| 9,202,483 B1 * | 12/2015 | Taniguchi et al. | ... | G11B 25/043 |
| 2003/0128633 A1 * | 7/2003 | Batra et al. | .............. | G11B 5/00 369/13.32 |

* cited by examiner

*Primary Examiner* — Craig A. Renner
(74) *Attorney, Agent, or Firm* — Kagan Binder, PLLC

(57) ABSTRACT

A hard disk drive includes a heat-assisted magnetic recording head and an enclosure. The enclosure is configured to contain the heat-assisted magnetic recording head and other components of the hard disk drive. The enclosure includes a base and a thermally processed top cover including a thermally oxidized interior surface. Preferably, a composition of the thermally oxidized surface of the thermally processed top cover comprises at least 5 percent oxygen. More preferably, an average oxidation depth of the thermally oxidized surface of the thermally processed top cover is at least 8 nanometers.

10 Claims, 5 Drawing Sheets

HEAT-ASSISTED MAGNETIC RECORDING HARD DISK DRIVE WITH A THERMALLY PROCESSED TOP COVER

CROSS-REFERENCE TO RELATED APPLICATIONS

This application claims the benefit of U.S. Provisional Patent Application having Ser. No. 63/477,408 titled "HEAT-ASSISTED MAGNETIC RECORDING HARD DISK DRIVE WITH A THERMALLY PROCESSED TOP COVER" filed Dec. 28, 2022, the entire contents of which are incorporated by reference for all purposes herein.

TECHNICAL FIELD

The disclosure relates to a heat-assisted magnetic recording hard disk drive.

BACKGROUND

Some hard disk drives (HDDs) utilize heat-assisted magnetic recording (HAMR) to increase the areal density of the HDD. A HAMR HDD typically includes a heat-assisted magnetic recording head (hereafter, a HAMR head) and other components disposed in an HDD enclosure. A HAMR head typically includes a laser, a near-field transducer (NFT), and a write pole. The laser emits electromagnetic radiation that resonates with free electrons of the NFT to excite localized surface plasmons (LSPs) on the NFT. The NFT is configured to emit a near-field of the LSPs. The near-field briefly heats a small spot on a surface of a magnetic disk of the HDD. The write pole is configured to write data to the magnetic disk in the vicinity of the heated spot.

Carbonaceous deposits may form on a HAMR head of the HDD due to organic contaminants in the HDD (e.g., from components of the HDD). In some instances, these carbonaceous deposits result in higher laser power, higher operating temperature, and/or thermal defects of the HAMR head. Oxygen may be included in a HAMR HDD to mitigate carbonaceous deposits. However, some components that are disposed in an interior volume of an HDD and/or components of an enclosure (e.g., a top cover) of an HDD may absorb oxygen and may deplete oxygen from the gas mixture of the HDD over time, potentially increasing the rate of carbonaceous deposit formation and degrading performance, reliability, and/or lifetime of the HAMR HDD.

SUMMARY

The present disclosure describes a heat-assisted magnetic recording hard disk drive (HAMR HDD) having a thermally processed top cover. The thermally processed top cover includes a thermally oxidized surface that faces the interior of an enclosure of the HAMR HDD. Including a thermally processed top cover in a HAMR HDD may, in some scenarios, reduce depletion of oxygen from an interior of the HAMR HDD, potentially reducing the occurrence of contamination-related defects and improving the performance, reliability, and/or lifetime of the HAMR HDD.

In one example, an HDD includes a HAMR head and an enclosure configured to contain the heat-assisted magnetic recording head and other components of the hard disk drive, the enclosure including a base and a thermally processed top cover.

In another example, a method of making an HDD includes the steps of providing a HAMR head; providing a base of an enclosure; making a thermally processed top cover of the enclosure; disposing the heat-assisted magnetic recording head in the base of the enclosure; and aligning and coupling the thermally processed top cover of the enclosure to a surface of the base of the enclosure.

In another example, a method of making a thermally processed top cover for an HDD includes the steps of providing a mechanically formed top cover and exposing the mechanically formed top cover to an environment having a temperature of at least 250 degrees Celsius.

These and other features and aspects of various examples may be understood in view of the following detailed discussion and accompanying drawings.

DETAILED DESCRIPTION

Figure 1A:
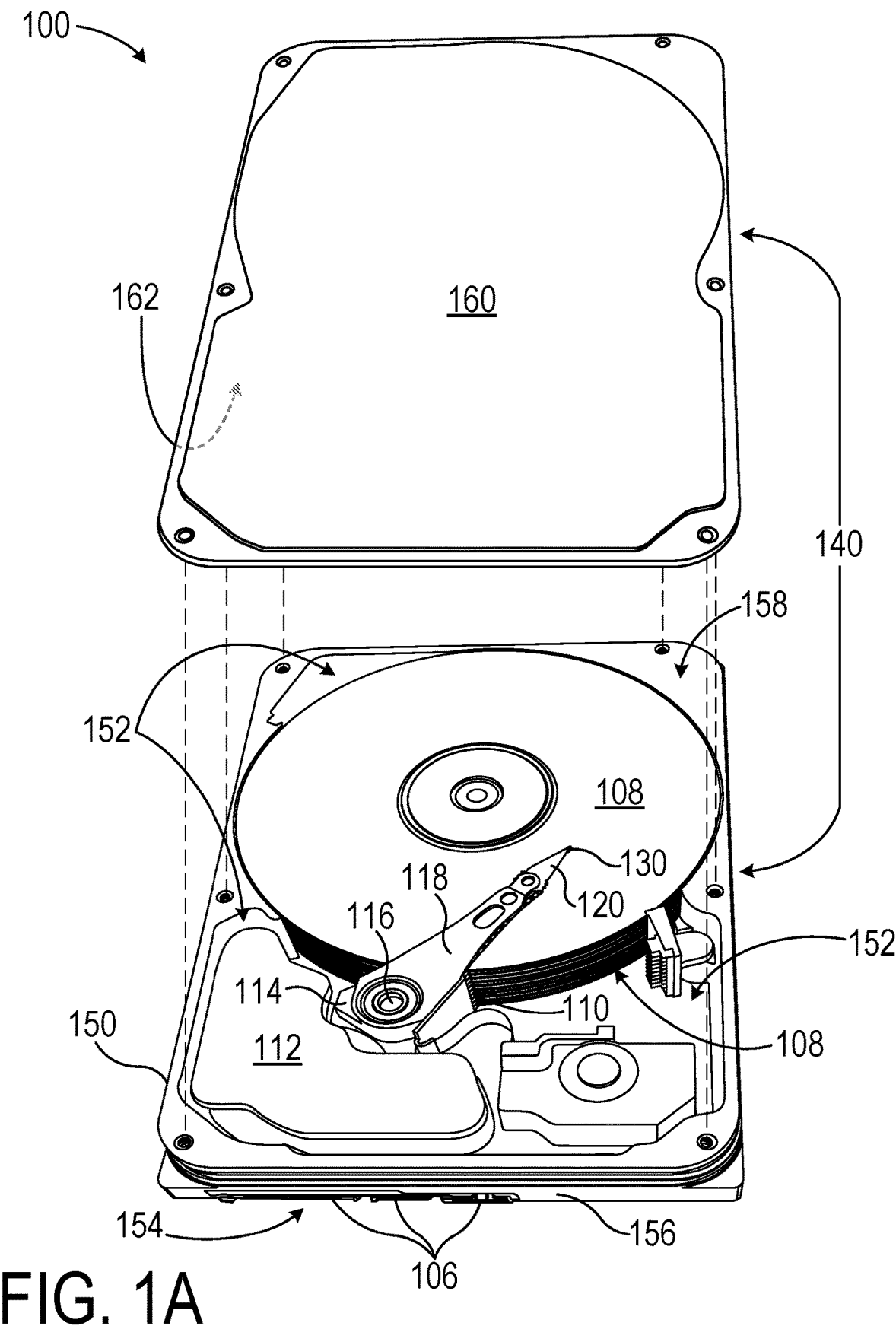
FIG. 1A is a perspective view of an example hard disk drive, in accordance with aspects of this disclosure.
Figure 1B:
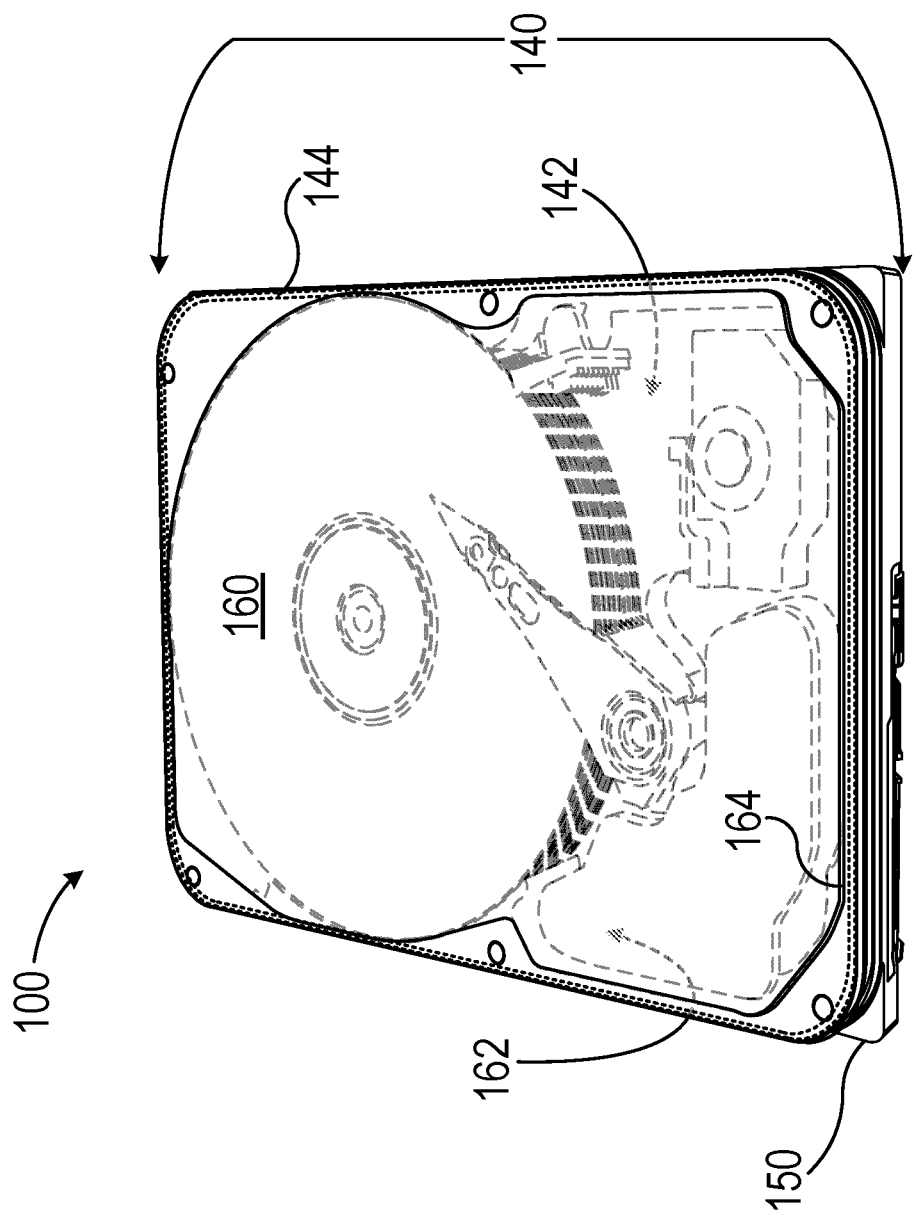
FIG. 1B is a perspective view of an example hard disk drive, in accordance with aspects of this disclosure.

FIGS. 1A and 1B are perspective views of an example hard disk drive (HDD), in accordance with aspects of this disclosure. HDD 100 includes a head stack assembly (HSA) 110 and one or more magnetic disks 108. HSA 110 includes a plurality of head gimbal assemblies (HGA) 120. Each HGA 120 includes a heat-assisted magnetic recording (HAMR) head 130. A voice coil drive actuator 112 generates a magnetic field that exerts a force on an actuator mechanism 114, causing actuator mechanism 114 to rotate about a shaft 116 in either rotational direction. Rotatable drive actuator arms 118 are mechanically coupled to actuator mechanism 114 and to each HGA 120 such that rotating actuator mechanism 114 causes rotatable drive actuator arms 118 and HGAs 120, and thus HAMR heads 130, to move relative to magnetic disks 108. While HDD 100 utilizes voice coil drive actuator 112 to move HGAs 120 relative to magnetic disks 108, other means of moving HGAs 120, such as a voice coil motor (VCM), are contemplated.

Each HAMR head 130 is configured to read data from and write data to a surface of a magnetic disk 108. A HAMR head 130 includes a reader, a writer, a light source such as a laser, a waveguide, and a near-field transducer (NFT). Other components of HAMR head(s) 130 (e.g., heaters, heat sinks, piezoelectric actuators) are contemplated. During a write operation of HDD 100, a HAMR head 130 may emit a near-field (e.g., from an NFT). The near-field may focus on a small spot on a surface of a magnetic disk 108 that is proximal to the HAMR head 130 (e.g., a magnetic disk 108 of FIG. 1). Energy of the near-field may heat and lower the coercivity of magnetic grains in the spot of focus on the magnetic disk 108, thereby enabling a magnetic field from a writer of the HAMR head 130 to orient magnetic moments of the magnetic grains and thus enabling bits of data to be written on the magnetic disk 108.

In accordance with aspects of this disclosure, HDD 100 includes an enclosure 140 configured to contain HAMR heads 130 and other components of HDD 100 (e.g., HSA 110, magnetic disks 108, voice coil drive actuator 112). Enclosure 140 includes a base 150 and a thermally processed top cover 160.

Base 150 includes a recess 152 to accommodate components of HDD 100. Base 150 further includes one or more apertures 154 through an outer wall 156 of base 150, the apertures 154 configured to access a plurality of input/output connectors 106 that are each configured to provide an interface with one or more host devices (e.g., a computer, a server, a consumer electronic device, etc.). Base 150 may be formed from any suitable material, such as metal (e.g., aluminum), plastic, composite, or other suitable material or combinations thereof. In some examples, base 150 comprises multiple components, such as an outer frame and a bottom cover, that are coupled together (e.g., by screws, by welding).

Thermally processed top cover 160 is a mechanically formed top cover (i.e., the material precursor to thermally processed top cover 160) that has been exposed to an environment having an elevated temperature (e.g., at least 250 degrees Celsius) for a duration of time (e.g., at least 1 hour). The environment may be the interior of an oven configured to bake components of electrical devices, a tube furnace, a vertical furnace, a rapid thermal annealer, or other suitable means of heating the mechanically formed top cover. This thermal exposure results in thermal oxidation of one or more surfaces of thermally processed top cover 160. Thermally processed top cover 160 includes an interior surface 162 that faces base 150. Interior surface 162 is a thermally oxidized surface.

The mechanically formed top cover may be exposed to a variety of conditions to produce the desired thermal oxidation on interior surface 162 of thermally processed top cover 160. In some examples, the mechanically formed top cover is exposed to an environment having a temperature of approximately 300° C. for 1 to 5 hours, 2 to 4 hours, or approximately 3 hours. Alternatively, the mechanically formed top cover may be exposed to an environment having a temperature of approximately 350° C. for a duration of 1 to 4 hours, 2 to 3 hours, or approximately 2.5 hours. Alternatively, the mechanically formed top cover may be exposed to an environment having a temperature of approximately 400° C. for a duration of 1 to 3 hours, 1.5 to 2.5 hours, or approximately 2 hours.

Thermally processed top cover 160 may be formed from a sheet of metal such as stainless steel. In some examples, thermally processed top cover 160 includes 304 stainless steel, an alloy that contains about 18-20% chromium and about 8-10.5% nickel. In some examples, thermally processed top cover 160 includes 430 stainless steel, an alloy that contains about 16-18% chromium but does not contain nickel and may therefore be less expensive than 304 stainless steel.

Thermally processed top cover 160 is configured to couple to base 150 to enclose components of HDD 100. FIG. 1B shows assembled HDD 100, with thermally processed top cover 160 aligned with and coupled to a surface of base 150 (a surface 158 of FIG. 1A) to form an interior volume 142 of HDD 100. Thermally oxidized interior surface 162 of thermally processed top cover 160 faces base 150 and interior volume 142. HAMR heads 130 and other components of HDD 100 are disposed in interior volume 142. Components other than those illustrated or specifically identified in FIGS. 1A and 1B are contemplated (e.g., a preamp, an environmental control module, a load/unload ramp, assembly hardware) and may be disposed in interior volume 142. Thermally processed top cover 160 may include a concavity 164 that is shaped to accommodate components of HDD 100 when thermally processed top cover 160 is coupled to base 150. Concavity 164 may be produced by a stamping process.

Thermally processed top cover 160 can be coupled to base 150 using any suitable technique, such as using one or more screws, connection fingers, locking/clipping structures, adhesives, rivets, other mechanical fasteners, welding (e.g., ultrasonic welding), or combinations thereof. In some examples, HDD 100 of FIG. 1B further includes a form-in-place gasket (FIPG) 144 configured to seal interior volume 142 of HDD 100. FIPG 144 of HDD 100 is disposed between base 150 and interior surface 162 of thermally processed top cover 160. One example of FIPG 144 is an epoxy (e.g., a two-part epoxy) that is applied to base 150 (e.g., surface 158 of FIG. 1A) and thermally cured after coupling thermally processed top cover 160 to base 150.

HDD 100 includes a gas mixture that is added after coupling thermally processed top cover 160 to base 150. The gas mixture is disposed in interior volume 142 of HDD 100. The gas mixture of HDD 100 may include helium and oxygen. Helium may be included in an HDD to reduce mechanical vibrations, particularly of HGAs of the HDD. Including helium in an HDD may enable lower head-media spacing (HMS) between a reader and/or writer of a HAMR head and a magnetic disk, and thus a higher areal density capability (ADC) of the HDD.

Oxygen is typically included in HDD 100 at a lower concentration than helium (e.g., less than 10% of the overall composition of the gas mixture). Oxygen may be included in an HDD to mitigate carbonaceous deposits that may form on a HAMR head of the HDD due to organic contaminants in the HDD (e.g., organic contaminants from components of the HDD). Formation of carbonaceous deposits on a HAMR head during the operating life of an HDD may reduce the intensity of the near-field that is emitted by the HAMR head and may increase the laser power that is required for the HAMR head to write data to a magnetic disk of the HDD. Increased laser power may increase the operating temperature of the HAMR head, potentially inducing thermal defects in the HAMR head that may reduce the reliability and/or lifetime of the HDD. The inclusion of oxygen in the gas mixture of an HDD may oxidize organic contaminants and may mitigate the formation of carbonaceous deposits on a HAMR head.

Some components that are disposed in an interior volume of an HDD and/or components of an enclosure (e.g., a top cover) of an HDD may absorb oxygen and may deplete oxygen from the gas mixture of the HDD over time, potentially increasing the rate of carbonaceous deposit formation and degrading performance, reliability, and/or lifetime of the HDD. In the example of HDD 100, including a thermally processed top cover 160 having a thermally oxidized interior surface 162 that faces interior volume 142 may result in reduced depletion of oxygen from the gas mixture over time. A more consistent oxygen concentration in the gas mixture of HDD 100 may result in a lower rate of carbonaceous deposit formation, and HDD 100 may thus demonstrate better performance, reliability, and/or lifetime when compared to an HDD that does not include a thermally processed top cover. Additionally, thermally processed top cover 160 may provide a lower cost solution for reducing oxygen depletion from a gas mixture of HDD 100 when compared with other solutions such as a nickel-plated top cover.

Figure 2:
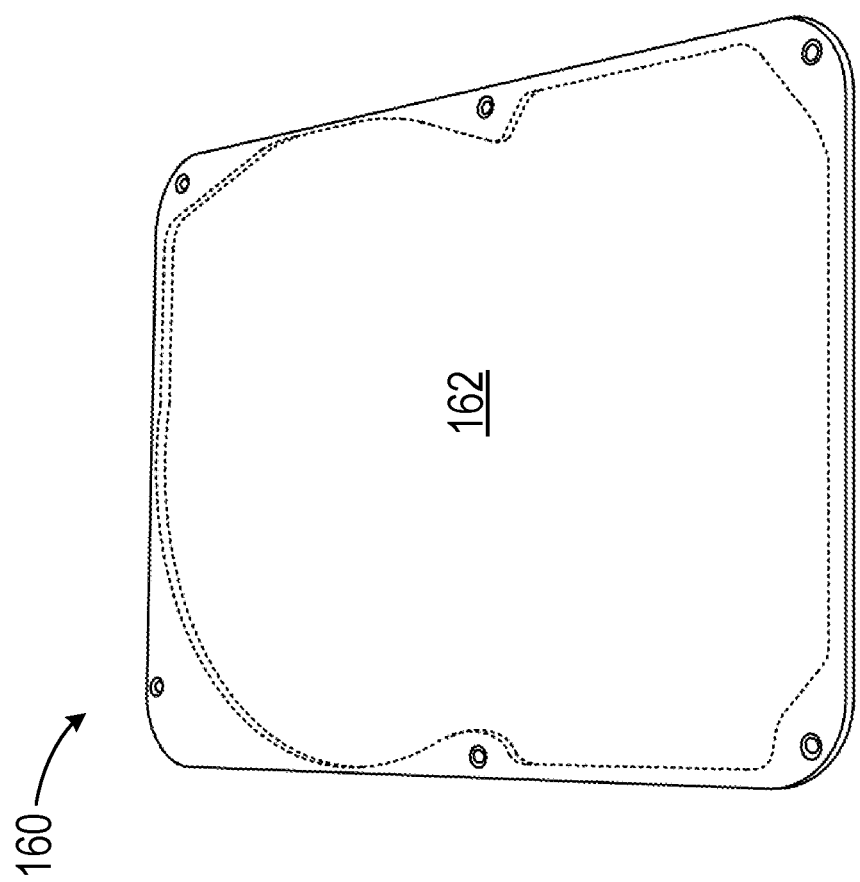
FIG. 2 is a perspective view of an example thermally processed top cover of a hard disk drive, in accordance with aspects of this disclosure.

FIG. 2 is a perspective view of an example thermally processed top cover of a hard disk drive, in accordance with aspects of this disclosure. FIG. 2 is a view of thermally oxidized interior surface 162 of thermally processed top cover 160 of HDD 100 of FIGS. 1A and 1B.

The composition of thermally oxidized interior surface 162 may be measured by scanning electron microscopy with energy dispersive x-ray analysis (SEM/EDX). A low accelerating voltage (e.g., 2 kV) may be used to minimize beam penetration and detect composition near thermally oxidized interior surface 162. In examples where thermally processed top cover 160 includes stainless steel, thermally oxidized interior surface 162 may include iron oxide, chrome oxide, and/or nickel oxide.

In some examples, thermally oxidized interior surface 162 may comprise at least 5 percent oxygen as measured by SEM/EDX using an accelerating voltage of 2 kV. In some examples, thermally oxidized interior surface 162 may comprise greater than 8 percent oxygen as measured by SEM/EDX using an accelerating voltage of 2 kV. A similar top cover that is not a thermally processed top cover, for example a top cover having the same stainless steel alloy but that has not been thermally processed, may comprise a lower surface oxygen composition (e.g., less than 3%) as measured under the same SEM/EDX conditions. Oxygen that is detected on a top cover that is not a thermally processed top cover may be a native oxide rather than a thermal oxide. The higher oxygen composition on thermally oxidized interior surface 162 of thermally processed top cover 160 may enable lower oxygen absorption by thermally processed top cover 160 and less oxygen depletion from a gas mixture of HDD 100 when compared to absorption by a top cover that is not a thermally processed top cover and has a lower surface oxygen composition.

The thermal oxidation of interior surface 162 may be characterized by an oxidation depth. The oxidation depth may be measured using techniques such as time-of-flight secondary ion mass spectroscopy (TOF-SIMS) or x-ray photoelectron spectroscopy (XPS) depth profiling. In some examples of thermally processed top cover 160, an average oxidation depth of thermally oxidized interior surface is at least 8 nm as measured by TOF-SIMS depth profiling. An average oxidation depth of thermally oxidized interior surface 162 of thermally processed top cover 160 may be at least 10 nm or, in some examples, at least 12 nm as measured by TOF-SIMS depth profiling. In contrast, an average oxidation depth on a surface of a similar top cover that is not a thermally processed top cover, for example a top cover having the same stainless steel alloy but that has not been thermally processed, may be less than 5 nm, or, in some instances, less than 3 nm. The greater oxidation depth measured on thermally oxidized interior surface 162 of thermally processed top cover 160 may result from exposure to an environment having an elevated temperature (e.g., at least 250 degrees Celsius) for a duration of time (e.g., at least 1 hour). The greater oxidation depth on thermally oxidized interior surface 162 of thermally processed top cover 160 may enable lower oxygen absorption by thermally processed top cover 160 and less oxygen depletion from a gas mixture of HDD 100 when compared to oxygen absorption by a top cover that is not a thermally processed top cover and has a lower surface oxidation depth.

Oxygen absorption of a top cover of an HDD may have a dependence on surface roughness of the top cover. In the instance of a top cover that is not a thermally processed top cover, a higher surface roughness may contribute to more oxygen absorption and a higher rate of oxygen depletion from a gas mixture of an HDD. In such instances, having a smoother surface finish (e.g., lower roughness) on the surface of top cover that faces the interior volume of the HDD may decrease the rate of oxygen absorption by the top cover. However, a smoother surface finish may have a higher cost than a surface having a higher roughness. Thermally processed top cover 160 may provide a cost benefit by at least partially negating the need for a very smooth surface finish on interior surface 162 in order to reduce oxygen absorption. A surface of a mechanically formed top cover that is used to produce thermally processed top cover 160 may have an arithmetic average surface roughness $R_a$ of at least 20 nanometers. In some examples, a surface of a mechanically formed top cover that is used to produce thermally processed top cover 160 has an arithmetic average surface roughness $R_a$ of at least 40 nanometers.

Figure 3:
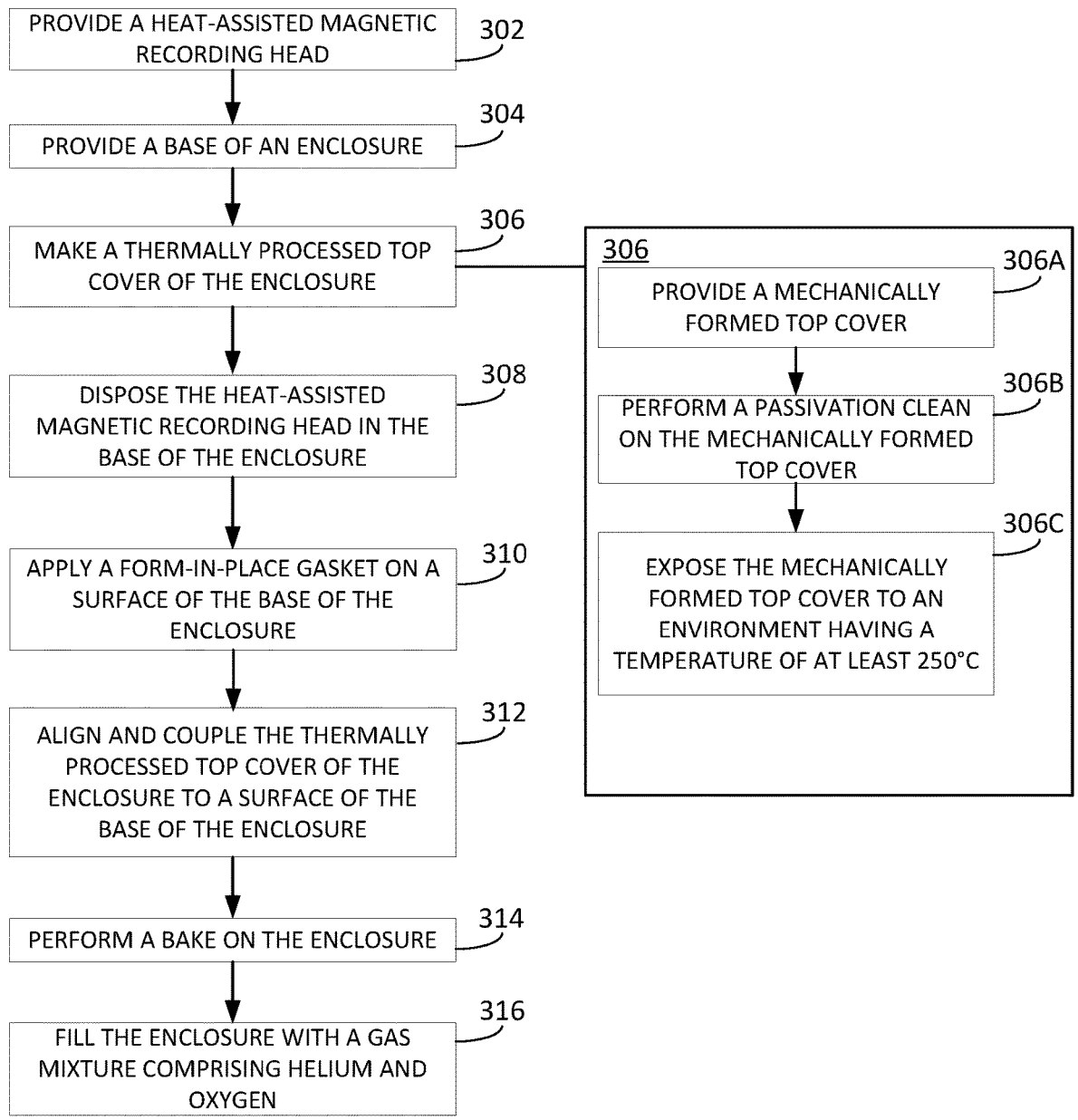
FIG. 3 is a flow diagram illustrating a method for making a hard disk drive, in accordance with aspects of this disclosure.

FIG. 3 is a flow diagram illustrating a method for making a hard disk drive, in accordance with aspects of this disclosure. FIG. 3 is described with reference to HDD 100 of FIGS. 1A and 1B.

In accordance with aspects of this disclosure, a method of making HDD 100 includes the steps of providing a heat-assisted magnetic recording (HAMR) head (302); providing a base of an enclosure (304); making a thermally processed top cover of the enclosure (306); disposing the heat-assisted magnetic recording head in the base of the enclosure (308); and aligning and coupling the thermally processed top cover of the enclosure to a surface of the base of the enclosure (312). The HAMR head of step 302 may be a HAMR head 130 of FIG. 1A. The enclosure of steps 304, 306, 308, and 312 may be enclosure 140 of FIGS. 1A and 1B. The base of an enclosure of step 304 may be base 150 of FIGS. 1A and 1B. The thermally processed top cover of step 306 may be thermally processed top cover 160 of FIGS. 1A, 1B, and 2. The surface of the base of the enclosure may be surface 158 of FIG. 1A.

The step of making the thermally processed top cover of the enclosure (306) includes the steps of providing a mechanically formed top cover (306A); and exposing the mechanically formed top cover to an environment having a temperature of at least 250 degrees Celsius (306C). The mechanically formed top cover may be a material precursor to thermally processed top cover 160 of FIGS. 1A, 1B, and 2. The mechanically formed top cover may be formed of stainless steel (e.g., 304 stainless steel, 430 stainless steel). A surface of the mechanically formed top cover may have an arithmetic average surface roughness $R_a$ of at least 20 nanometers or, in some examples, at least 40 nanometers. The environment may be the interior of an oven configured to bake components of electrical devices, a tube furnace, a vertical furnace, a rapid thermal annealer, or other suitable means of heating the mechanically formed top cover.

Step 306C may cover a variety of conditions to produce the desired thermal oxidation on a thermally processed top cover. In some examples of step 306C, the mechanically formed top cover is exposed to an environment having a temperature of approximately 300° C. for 1 to 5 hours, 2 to 4 hours, or approximately 3 hours. Alternatively, the mechanically formed top cover may be exposed to an environment having a temperature of approximately 350° C. for a duration of 1 to 4 hours, 2 to 3 hours, or approximately 2.5 hours. Alternatively, the mechanically formed top cover may be exposed to an environment having a temperature of approximately 400° C. for a duration of 1 to 3 hours, 1.5 to 2.5 hours, or approximately 2 hours.

The step of making the thermally processed top cover of the enclosure (306) may further include the step of performing a passivation clean on the mechanically formed top cover (306B) before the step of exposing the mechanically formed top cover to an environment having a temperature of at least 250 degrees Celsius (306C). A passivation clean of step 306B may, for example, include a solvent and/or alkaline clean to remove contaminants from the mechanically formed top cover (e.g., oils from manufacturing). In some examples, a passivation clean of step 306B includes an acid clean (e.g., to remove native oxide, to remove free metal such as iron).

A method of making HDD 100 in accordance with aspects of this disclosure may include the steps of applying a form-in-place gasket (FIPG) on the surface of the base of the enclosure (310) before the step of aligning and coupling the thermally processed top cover of the enclosure to the base of the enclosure (312); and performing a bake on the enclosure (314) after the step of aligning and coupling the thermally processed top cover of the enclosure to the base of the enclosure (312). The bake of step 314 may be configured to thermally cure the FIPG applied in step 310. The surface of step 310 may be surface 158 of base 150 of FIG. 1A. The FIPG of steps 310 and 314 may be an epoxy (e.g., a two-part epoxy) that is applied to the surface of the base and thermally cured after coupling thermally processed top cover to the base (e.g., during step 314).

A method of making HDD 100 in accordance with aspects of this disclosure may include the step of filling the enclosure with a gas mixture (316) after the step of aligning and coupling the thermally processed top cover of the enclosure to the base of the enclosure, the gas mixture comprising helium and oxygen. The gas mixture may be disposed in interior volume 142 of FIG. 1B. Oxygen may be included in HDD 100 at a lower concentration than helium (e.g., less than 10% of the overall composition of the gas mixture).

Figure 4:
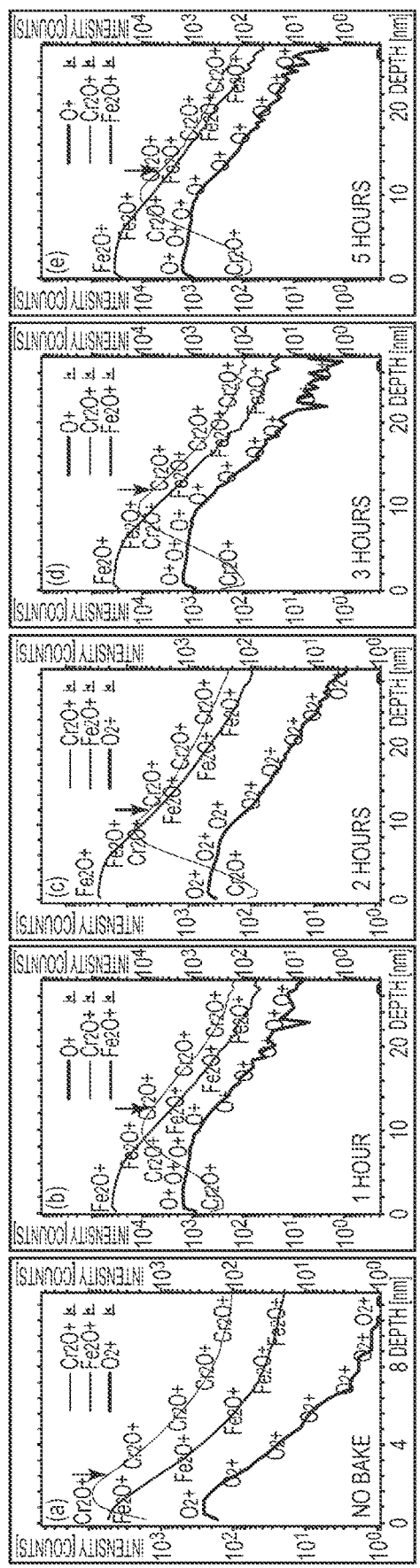
FIG. 4 is a series of plots of intensity versus depth of time-of-flight secondary ion mass spectroscopy (TOF-SIMS) depth profiles of example top covers of hard disk drives, in accordance with aspects of this disclosure.

FIG. 4 is a series of plots of intensity versus depth of time-of-flight secondary ion mass spectroscopy (TOF-SIMS) depth profiles of example stainless steel top covers of hard disk drives, in accordance with aspects of this disclosure. Plot (a) is an example top cover that is not a thermally processed top cover. Plots (b)-(c) are example thermally processed top covers (e.g., thermally processed top cover 160 of FIGS. 1A, 1B, and 2) that have been baked in a bake oven at 300° C. for varied durations, according to step 306 of FIG. 3 (1 hour for (b), 2 hours for (c), 3 hours for (d), 5 hours for (e)). Depth profile measurements were taken using dual beam TOF-SIMS depth profiling, with a 70 nA Ar sputtering beam and a 15 keV B11 analysis beam. Each plot shows intensity versus depth curves for oxygen ($O^+$), iron oxide ($Fe_2O^+$), and chromium oxide ($Cr_2O^+$). Arrows on each plot show the approximate depth in nanometers of the stainless steel alloy of the mechanically formed top cover, and thus provide an approximate depth of thermal oxidation that occurred during step 306 of FIG. 3. Plots (b)-(e) show greater oxidation depth the thermally processed top covers, about 12 to 13 nm, compared to an oxidation depth of less than about 3 nm for the top cover that is not a thermally processed top cover.

Various examples have been presented for the purposes of illustration and description. These and other examples are within the scope of the following claims.

What is claimed is:

1. A hard disk drive comprising:
a heat-assisted magnetic recording head; and
an enclosure configured to contain the heat-assisted magnetic recording head as operatively provided so as to be positionable relative to at least one magnetic recording disk that is operatively rotatably supported within the enclosure, the enclosure comprising:
a base; and
a thermally processed top cover including a thermally oxidized interior surface,
wherein a composition of the thermally oxidized surface of the thermally processed top cover comprises at least 5 percent oxygen.

2. The hard disk drive of claim 1, wherein the composition of the thermally oxidized surface of the thermally processed top cover comprises the at least 5 percent oxygen as measured by scanning electron microscopy with energy dispersive x-ray analysis using an accelerating voltage of 2 kilovolts.

3. The hard disk drive of claim 1, wherein an average oxidation depth of the thermally oxidized surface of the thermally processed top cover is at least 8 nanometers as measured by time-of-flight secondary ion mass spectroscopy depth profiling.

4. The hard disk drive of claim 1, wherein the thermally processed top cover is formed from stainless steel.

5. The hard disk drive of claim 4, wherein the stainless steel is one of 304 stainless steel or 430 stainless steel.

6. The hard disk drive of claim 4, wherein the thermally oxidized surface comprises iron oxide.

7. The hard disk drive of claim 1,
wherein, the thermally processed top cover is aligned with and coupled to the base to form an interior volume of the hard disk drive,
wherein the interior surface of the thermally processed top cover faces the base and the interior volume of the hard disk drive, and
wherein the heat-assisted magnetic recording head and other components of the hard disk drive are disposed in the interior volume of the hard disk drive.

8. The hard disk drive of claim 7, further comprising a form-in-place gasket configured to seal the interior volume of the hard disk drive, the form-in-place gasket disposed between the base and the interior surface of the thermally processed top cover.

9. A hard disk drive comprising:
a heat-assisted magnetic recording head; and
an enclosure configured to contain the heat-assisted magnetic recording head as operatively provided so as to be positionable relative to at least one magnetic recording disk that is operatively rotatably supported within the enclosure, the enclosure comprising:
a base; and
a thermally processed top cover including a thermally oxidized interior surface,
wherein an average oxidation depth of the thermally oxidized surface of the thermally processed top cover is at least 8 nanometers.

10. The hard disk drive of claim 9, wherein the average oxidation depth of the thermally oxidized surface of the thermally processed top cover is at least 8 nanometers as measured by time-of-flight secondary ion mass spectroscopy depth profiling.

* * * * *